United States Patent [19]
Kania et al.

[11] Patent Number: 5,865,083
[45] Date of Patent: Feb. 2, 1999

[54] HOLDER UNIT FOR A ROTARY KNIFE PAIR

[75] Inventors: Hubert Kania, Herne; Thomas Kolodzey, Bottrop-Kirchhellen; Norbert Lentz; Steffen Rötz, both of Essen, all of Germany

[73] Assignee: Krupp Kunststofftechnik GmbH, Essen, Germany

[21] Appl. No.: 850,937

[22] Filed: May 5, 1997

[30]     Foreign Application Priority Data

May 3, 1996   [DE]   Germany .................. 196 17 713.8

[51] Int. Cl.$^6$ ........................................ B23D 19/04
[52] U.S. Cl. .............................. 83/501; 83/503; 83/504; 83/698.61
[58] Field of Search ................ 83/500, 501, 504, 83/507, 508, 698.61, 508.2, 503

[56]             References Cited

U.S. PATENT DOCUMENTS

| | | | |
|---|---|---|---|
| 3,908,499 | 9/1975 | Reed | 83/665 |
| 4,220,064 | 9/1980 | Potter | 83/665 |
| 4,245,534 | 1/1981 | Van Cleave | 83/500 |
| 4,280,386 | 7/1981 | Ward, Sr. | 83/500 |
| 4,380,945 | 4/1983 | Guild et al. . | |
| 4,962,684 | 10/1990 | Mowry | 83/332 |
| 5,007,318 | 4/1991 | Cox et al. | 83/425.2 |
| 5,025,693 | 6/1991 | Tidland et al. | 83/482 |
| 5,325,753 | 7/1994 | Schussler | 83/481 |
| 5,447,086 | 9/1995 | Wittmaier et al. . | |
| 5,690,012 | 11/1997 | Blandin et al. . | |

FOREIGN PATENT DOCUMENTS

| | | |
|---|---|---|
| 381 662 | 11/1986 | Austria . |
| 0 058 629 | 8/1982 | European Pat. Off. . |
| 0 569 767 | 11/1993 | European Pat. Off. . |
| 0 737 552 | 10/1996 | European Pat. Off. . |
| 40 05 271 | 10/1991 | Germany . |
| 43 08 044 | 10/1994 | Germany . |
| 44 05 399 | 8/1995 | Germany . |
| 94/00261 | 1/1994 | WIPO . |

*Primary Examiner*—Eugenia Jones
*Assistant Examiner*—Kevin G. Verceene
*Attorney, Agent, or Firm*—Spencer & Frank

[57]              ABSTRACT

A knife holder unit combined with a rotary knife pair includes a frame composed of an upper frame part and a lower frame part; and an upper and a lower knife holder assembly supported in the upper and the lower frame part, respectively. Each knife holder assembly includes a bearing shaft composed of a first bearing shaft part having a longitudinal axis and an adjoining second bearing shaft part. The first bearing shaft part is received in a recess of a respective frame part for turning motions therein about the longitudinal axis. A first securing arrangement immobilizes the first bearing shaft part relative to the respective frame part. A rotary bearing surrounds the second bearing shaft part and has a rotary axis which is offset relative to the longitudinal axis to define an eccentricity therewith. A rotary knife is mounted on the rotary bearing. The rotary knife of the first knife holder assembly and the rotary knife of the second knife holder assembly cooperate with one another and together define a cutting plane which passes through the rotary bearing of the upper and lower knife holder assemblies. A second securing arrangement affixes the rotary knife to the rotary bearing.

15 Claims, 2 Drawing Sheets

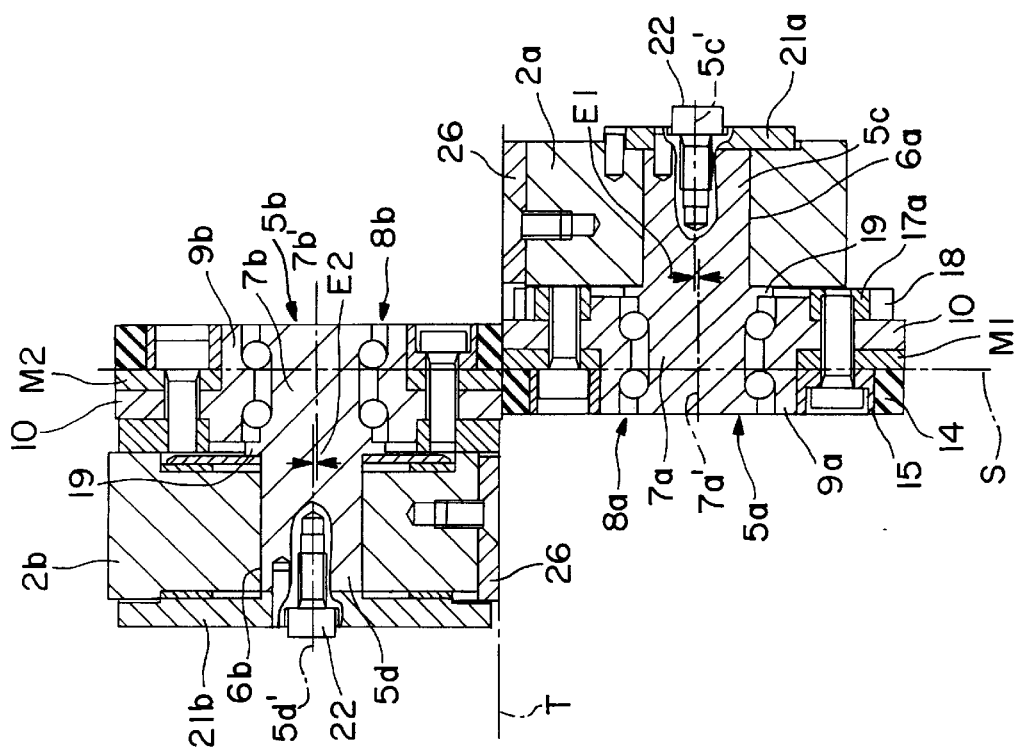

HOLDER UNIT FOR A ROTARY KNIFE PAIR

CROSS REFERENCE TO RELATED APPLICATION

This application claims the priority of German Application No. 196 17 713.8 filed May 3, 1996, which is incorporated herein by reference.

BACKGROUND OF THE INVENTION

In rotary knife units for cutting metal sheets into strips or severing strips into blanks, the rotary knives are disposed either on two knife shafts as shown, for example, in German Patent No. 4,005,271 or are positioned in pairs on individually shiftable holder assemblies, such as disclosed, for example, in Published International Patent Application No. WO 94/00261.

The invention relates to a knife holder unit of the second type outlined above. The holder unit has a frame which is longitudinally displaceable on guide rails and has an upper and lower part for separately supporting a respective rotary knife. The cutting edges of the rotary knives oriented towards one another define a cutting plane, and further, in practice, they define a cutting gap. For purposes relevant here, the term "cutting plane" is being used without considering the cutting gap.

The knife holder unit disclosed in International Published Patent Application WO 94/00261 has a great number of individual components, such as a central knife shaft, a centering member for the transport ring and the rotary knife, two roller bearings, a threaded shifting sleeve, slit nuts, as well as a holder which supports the shifting sleeve and which passes through the machine frame. If certain tolerance values are assigned to each individual component, a summation of the individual tolerances may result in a substantial deviation and conversely: if for the rotary knife a certain tolerance is prescribed then the individual components must have very narrow tolerance values which requires a high technological input in the manufacture. The rotary knives supported by the known holder unit are countersupported on one part of the shaft which is situated externally of its bearing whereby a substantial cantilever length is obtained which leads to risks of tilting that may adversely affect the cutting operation. For disassembling the knives, due to their overlap, first a centering component has to be removed which additionally increases the labor input for assembly and disassembly.

SUMMARY OF THE INVENTION

It is an object of the invention to provide an improved holder unit for rotary knives in which the required number of components is reduced, the safety against tilting is increased and the technological input for making as well as assembling and disassembling the unit is lessened.

This object and others to become apparent as the specification progresses, are accomplished by the invention, according to which, briefly stated, the knife holder unit combined with a rotary knife pair includes a frame composed of an upper frame part and a lower frame part; and an upper and a lower knife holder assembly supported in the upper and the lower frame part, respectively. Each knife holder assembly includes a bearing shaft composed of a first bearing shaft part having a longitudinal axis and an adjoining second bearing shaft part. The first bearing shaft part is received in a recess of a respective frame part for turning motions therein about the longitudinal axis. A first securing arrangement immobilizes the first bearing shaft part relative to the respective frame part. A rotary bearing surrounds the second bearing shaft part and has a rotary axis which is offset relative to the longitudinal axis to define an eccentricity therewith. A rotary knife is mounted on the rotary bearing. The rotary knife of the first knife holder assembly and the rotary knife of the second knife holder assembly cooperate with one another and together define a cutting plane which passes through the rotary bearing of the upper and lower knife holder assemblies. A second securing arrangement affixes the rotary knife to the rotary bearing.

A shaft which is fixedly held in a frame has a high load-bearing capacity. The feature that the cutting plane traverses the rotary bearing provides that the rotary bearing is arranged in a zone where the forces are applied and thus risks that the rotary knives will tilt are reduced. By virtue of the eccentricity of the rotary bearing with respect to the shaft part situated in the frame, by turning the shaft the rotary knives are pivoted out of their overlapping relationship and thereafter they may be removed or replaced without difficulty.

According to an advantageous feature of the invention, the motion of the shaft part situated in the frame in the direction of the rotary bearing is limited by a flange or stepped portion and thus a precise axial positioning of the shaft and the knives supported thereon is achieved.

According to another advantageous feature of the invention, the shaft is urged into and immobilized in the frame by a cover plate.

To ensure a safe operation, according to a further feature of the invention the cover plate is secured against rotation of the shaft and the frame. A securement against rotation of the cover plate with respect to the frame may be effected by a spring-biased detent device and a rotation relative to the shaft may be ensured by centering pins.

For setting the cutting gap between the two rotary knives, according to a further feature of the invention between the rotary bearing and the frame a spring is disposed and further, the possibility of immobilizing the shaft is combined with an axial adjustability thereof. According to an advantageous feature of the invention, such an axial adjustability is made possible by varying the axial distance between a central engagement face of the cover plate abutting the shaft and a central engagement face of the closure plate abutting the frame.

According to a particularly advantageous feature of the invention resulting in a compact construction, the rotary bearings are directly formed by a part of the shaft held in the frame and/or by a ring (outer race) carrying the rotary knife. In case of a predetermined knife diameter the shaft and the bearing may be of large dimensions, resulting in a high load-bearing capacity and a long service life of the component.

The rotary knife is secured against a flange of the outer race of the rotary bearing, and it may be rapidly positioned thereon by means of a centering, stepped part.

As a rule, a transport ring mounted on the outer race of the rotary bearing axially adjacent the rotary knife has to be replaced more frequently than the rotary knife. To take such a circumstance into consideration, additional securing means are provided for a separate assembly and disassembly of the transport rings as well as their securement.

The knife holder unit according to the invention may be used in a particularly advantageous manner by providing that the upper and lower frame parts and a connecting member coupling the two frame parts in the transporting direction of the workpiece to be cut are arranged essentially in an S-shaped configuration. A wear of the frame proper is reduced by providing its faces oriented towards the transporting plane of the workpieces with wear-resistant plates.

BRIEF DESCRIPTION OF THE DRAWINGS

FIG. 1 is a side elevational view of a preferred embodiment of the invention, facing the transporting direction of the workpiece (particularly sheet metal) to be cut.

FIG. 2 is a sectional side elevational view of the preferred embodiment.

DESCRIPTION OF THE PREFERRED EMBODIMENTS

Figure 3:
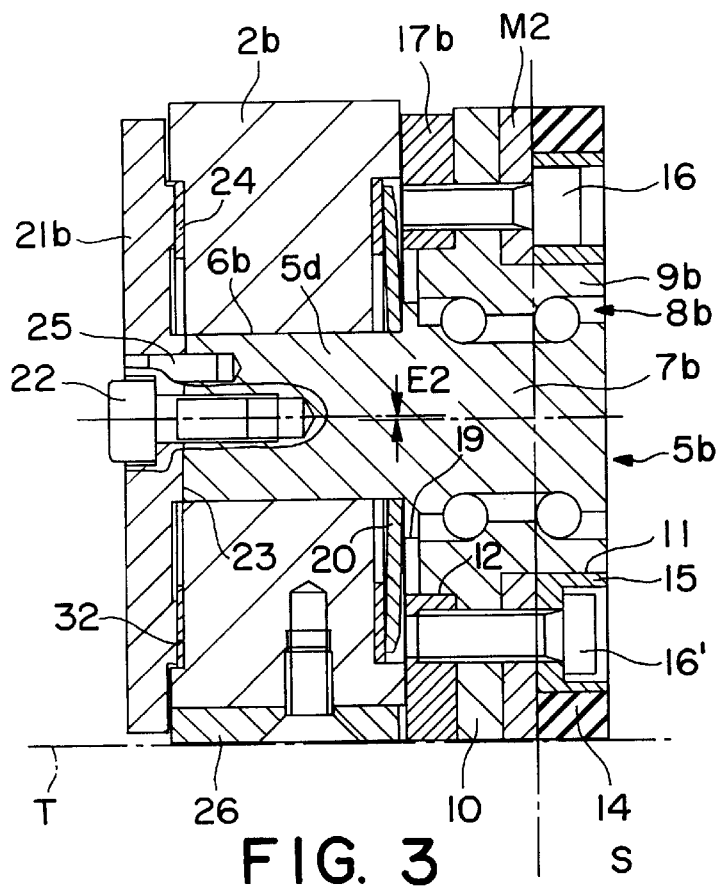
FIG. 3 is a sectional side elevational view of the upper part of the preferred embodiment.

FIG. 1 shows one of a plurality of rotary knife holder units 1 displaceable on and affixable to rails 4. The holder unit 1 has a generally S-shaped frame 2 mounted on a sled 3 which may slide on the rails 4. The frame 2 comprises a lower part 2a and an upper part 2b, both parts being arranged offset relative to a cutting plane S and combined via an inclined joining or connecting part 2c. All three parts 2a, 2b and 2c form the single-part frame 2.

At the left side of the lower part 2a of the frame 2 a lower annular rotary knife M1 is supported, while at the right side of the upper frame part 2b an upper annular rotary knife M2 is supported. The radial faces of the rotary knives M1, M2 oriented away from the respective frame part 2a and 2b lie essentially in the same plane, constituting the cutting plane S.

Turning to FIG. 2, for supporting the rotary knives M1, M2 respective bearing shafts 5a and 5b are provided. The bearing shafts 5a, 5b have respective first shaft parts 5c, 5d inserted in respective openings 6a, 6b of the frame parts 2a, 2b. As viewed in the axial direction, the first shaft parts 5c, 5d are adjoined by respective second shaft parts 7a, 7b projecting from the frame part 2a and 2b towards the respective other frame part 2b, 2a. The shaft parts 7a, 7b constitute the inner parts of respective rotary bearings (roller bearings) 8a, 8b and support roller bodies (bearing balls) thereon. The central axis 7a', 7b' of the roller bearing parts 7a, 7b and the longitudinal axis 5c', 5d', of the bearing shaft parts 5c, 5d are offset relative to one another and thus have a respective eccentricity E1, E2.

The bearing shafts 5a and 5b are rotatably supported for turning motions about the longitudinal axis 5c', 5d' in openings 6a, 6b of the frame parts 2a, 2b, so that the axis 7a', 7b' of the bearing parts 7a, 7b—as viewed axially—may be brought upwardly, downwardly, towards the right, towards the left and into all intermediate positions relative to the longitudinal axis 5c', 5d' of the bearing shaft parts 5c, 5d.

The rotary bearings 8a, 8b each have an outer carrier ring (outer race) 9a, 9b provided with a respective flange 10. Also referring to FIG. 3, on axially opposite sides of the flange 10 circumferential recesses are provided, having respective centering steps 11 and 12.

The recess having the centering step 11, oriented away from the bearing shaft 5a, 5b receives the respective rotary knives M1 and M2 in such a manner that they are sandwiched between the flange 10 and a carrier ring 15, each being provided with an elastic transport ring 14. The securement of the rotary knives M1, M2 is effected by screws 16 which threadedly engage a corresponding thread of a holding ring 17a, 17b arranged in the recess having the centering step 12. Additional screws 16' are provided for securing the respective carrier rings 15.

The lower holding ring 17a is provided with external teeth 18 and meshes with a non-illustrated drive wheel for rotating the outer bearing race 9a and thus the rotary knife M1.

A respective circumferential flange 19 is arranged between the two bearing shaft parts 5c, 7a and, respectively, 5d, 7b of the bearing shafts 5a, 5b. The flange 19 forming part of the lower bearing shaft 5a serves directly as an engagement face with the lower frame part 2a. As also shown in FIG. 3, in the upper bearing shaft 5b, between the flange 19 and the upper frame part 2b a spring ring 20 is arranged which biases the bearing shaft 5b together with the rotary knife M2 axially against the lower knife assembly.

The bearing shafts 5a, 5b are drawn into and immobilized in the respective recesses 6a, 6b by screws 22 via the cover plates 21a, 21b which engage the outer side of the frame parts 2a, 2b. By virtue of the engagement of the flange 19 of the bearing shaft 5a with the frame part 2a an unequivocal axial position of the lower knife assembly is obtained.

As shown in FIG. 3, the upper cover plate 21b has a central engagement surface 23 which engages the radial end face of the bearing shaft 5b. The upper cover plate 21b further has, relative to the engagement surface 23, a radially outer engagement face 24 which is arranged to lie against the upper frame part 2b. By changing the axial distance between the engagement faces 23, 24 relative to one another, the axial position of the bearing shaft 5b and thus the cutting gap C between the two rotary knives M1 and M2 may be set. Such an axial distance change may be effected by inserting a washer 32 of chosen axial thickness between the engagement face 24 and the upper frame part 2b.

Figure 4:
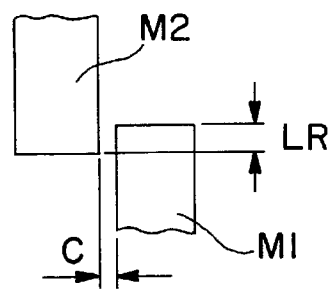
FIG. 4 illustrates the position of the rotary knives relative to one another.

The cover plate 21b is attached to the bearing shaft 5b with pins 25 such that the two components cannot rotate relative to one another. By turning the cover plate 21b the bearing shaft 5b rotates and thus the position of the eccentricity E2 may be changed. In this manner, as shown in FIG. 4, a radial overlap LR is set for the cutting operation when workpieces to be cut are conveyed in the transporting plane T through the rotary knife pair M1, M2 forwardly, toward the observer of FIG. 1. Stated differently, the two peripheral lines of the rotary knives M1, M2 intersect as viewed in the axial direction.

When at least one of the rotary knives M1 or M2 is to be installed or removed, at least one of the bearing shafts 5a or, respectively, 5b is pivoted in such a manner that the eccentricity of the shaft part 7a or, respectively, 7b is oriented away from the other knife bearing and thus an overlap between the rotary knives M1 and M2 is eliminated. Thereafter either the transport ring 14 alone or together with the associated rotary knife M1 or M2 or the entire knife bearing, including the bearing shaft 5a or, respectively, 5b may be replaced. The anti-wear plates 26 shown in FIGS. 2 and 3 prevent a wear of the frame 2.

Figure 5:
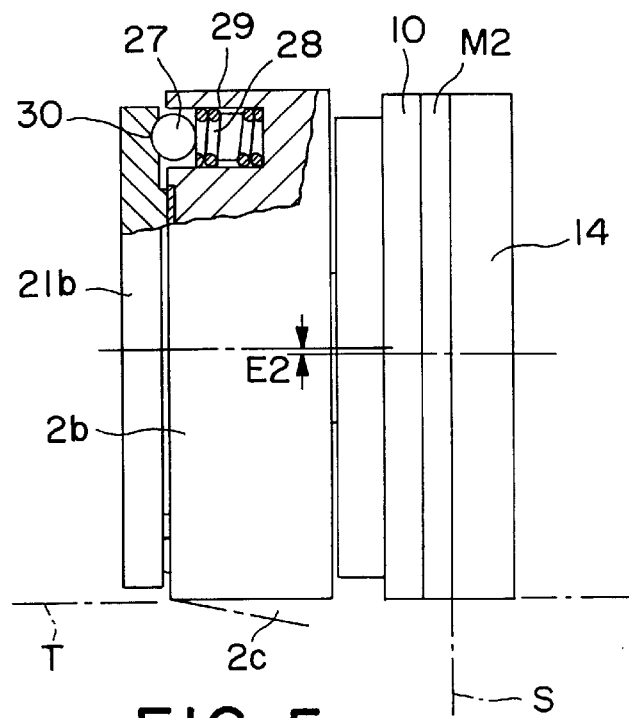
FIG. 5 is a side elevational view, partially in section, of a variant of the upper part of the knife holder unit.

In FIG. 5 a spring-biased ball 27 is shown which, together with a biasing spring 28, is positioned in a recess 29 of the upper frame part 2b. The cover plate 21b has two or more small recesses 30 at appropriate locations for partially receiving the spring-loaded ball 27. When the cover plate 21b is turned, the lowermost and uppermost position of the eccentricity E2 and, if required, intermediate positions may be easily found as the ball 27 snaps into an aligned recess 30.

It will be understood that the above description of the present invention is susceptible to various modifications, changes and adaptations, and the same are intended to be comprehended within the meaning and range of equivalents of the appended claims.

What is claimed is:

1. A knife holder unit combined with a rotary knife pair, comprising
   (a) a frame composed of an upper frame part and a lower frame part;
   (b) an upper and a lower knife holder assembly supported in said upper and said lower frame part, respectively; each said knife holder assembly including
      (1) a bearing shaft composed of a first bearing shaft part having a longitudinal axis and an adjoining second bearing shaft part; said first bearing shaft part being received in a recess of a respective said frame part for turning motions therein about said longitudinal axis;
      (2) first securing means for immobilizing said first bearing shaft part relative to said respective frame part;
      (3) a rotary bearing surrounding said longitudinal axis and having a rotary axis being offset relative to said longitudinal axis to define an eccentricity between said rotary axis and said longitudinal axis;
      (4) a rotary knife forming one knife of the knife pair and being mounted on said rotary bearing; the rotary knife of said upper knife holder assembly and the rotary knife of said lower knife holder assembly cooperating with one another and together defining a cutting plane passing through said rotary bearing of said upper and lower knife holder assemblies; and
      (5) second securing means for affixing said rotary knife to said rotary bearing; and
   (c) means for driving at least one of said rotary knives.

2. The knife holder unit as defined in claim 1, further comprising a radially extending flange provided on said bearing shaft; said flange separating said first and second bearing shaft parts from one another.

3. The knife holder unit as defined in claim 1, further comprising
   (a) a spring disposed between said rotary bearing of one of said upper and lower knife holder assemblies and said frame part supporting said one assembly for axially urging the rotary knife of said one assembly towards the rotary knife of the other of said upper and lower knife holder assemblies; and
   (b) adjusting means for setting an axial position of said rotary knife of said one assembly.

4. The knife holder unit as defined in claim 1, further wherein said frame has a connecting part coupling the upper frame part with the lower frame part; said frame having a generally S-shaped configuration as viewed in elevation, in a direction perpendicularly to said longitudinal axes.

5. The knife holder unit as defined in claim 1, further comprising wear-resistant plates attached to said frame on either sides of said knife holder assemblies; said wear-resistant plates having outer faces together defining a conveying plane in which workpieces to be cut by the rotary knife pair are advanced.

6. The knife holder unit as defined in claim 1, wherein said rotary bearing comprises roller bodies, an inner part formed by said second bearing shaft part and an outer bearing race supporting said rotary knife; said roller bodies being supported on said second bearing shaft part and said outer bearing race being supported on said roller bodies.

7. The knife holder unit as defined in claim 6, wherein said outer race has a radial flange and a centering shoulder for receiving said rotary knife.

8. The knife holder unit as defined in claim 7, further comprising
   (a) a transport ring positioned on said outer race of each said assembly; said rotary knife being situated between said flange and said transport ring; and
   (b) third securing means for attaching said transport ring to said outer race.

9. The knife holder unit as defined in claim 1, wherein each said assembly further comprises a cover plate positioned over said recess in the respective said frame part and being in engagement with an end of said first bearing shaft part; said first securing means including means for tightening said cover plate against said frame part and for immobilizing said first bearing shaft part in said recess by means of said cover plate.

10. The knife holder unit as defined in claim 9, further comprising
    (a) a spring disposed between said rotary bearing of one of said upper and lower knife holder assemblies and said frame part supporting said one assembly for axially urging the rotary knife of said one assembly towards the rotary knife of the other of said upper and lower knife holder assemblies; and
    (b) adjusting means for setting an axial position of said rotary knife of said one assembly; said adjusting means comprising
       (1) a first engagement face provided between the cover plate of said one assembly and said first bearing shaft part of said bearing shaft of said one assembly;
       (2) a second engagement face provided between the cover plate of said one assembly and the frame part supporting said one assembly; and
       (3) means for adjusting an axial distance between said first and second engagement faces for setting an axial position of said bearing shaft relative to said frame part supporting said one assembly.

11. The knife holder unit as defined in claim 10, wherein said means for adjusting said axial distance comprises a washer of selected axial thickness disposed between said cover plate and said frame part.

12. The knife holder unit as defined in claim 9, wherein said first securing means further comprises rotation preventing means for preventing an angular displacement of said cover plate relative to said frame part and said bearing shaft.

13. The knife holder unit as defined in claim 12, wherein said rotation preventing means comprises axially extending holes provided in said cover plate and in said bearing shaft; said holes being disposed at a radial distance from said longitudinal axis; and a securing pin received in said holes when said holes are in alignment with one another.

14. The knife holder unit as defined in claim 12, wherein said first securing means includes a detent supported in said frame part and a depression provided in said cover plate; said detent being received in said depression when said depression is in alignment with said detent.

15. The knife holder unit as defined in claim 14, wherein said detent comprises a spring-biased ball.

* * * * *